United States Patent [19]

Giebeler, Jr.

[11] Patent Number: 4,541,736
[45] Date of Patent: Sep. 17, 1985

[54] CENTRIFUGAL OIL PUMP FLOW PROPORTIONING AND COOLING SYSTEM

[75] Inventor: Robert H. Giebeler, Jr., Cupertino, Calif.

[73] Assignee: Beckman Instruments, Inc., Fullerton, Calif.

[21] Appl. No.: 605,355

[22] Filed: Apr. 30, 1984

[51] Int. Cl.[4] .................... F16C 33/66; F16C 37/00; F01M 9/12

[52] U.S. Cl. .................... 384/465; 184/6.18; 384/368; 384/468; 384/474; 384/900

[58] Field of Search ............ 384/465, 462, 466-474, 384/322, 389, 390, 392, 368, 397-415, 900; 184/6.18, 50 A, 104 R; 308/187

[56] References Cited

U.S. PATENT DOCUMENTS 1,180,338  4/1916  Symanzik ............ 384/368
2,012,579  8/1935  Obayashi ............ 384/465
2,597,405  5/1952  Tholl ............... 384/465
2,766,081 10/1956  Wiedemann .......... 384/368

Primary Examiner—Stuart S. Levy
Assistant Examiner—Thomas Hannon
Attorney, Agent, or Firm—W. H. May; P. R. Harder

[57] ABSTRACT

A system for cooling and lubricating the drive motor of a centrifuge. The shaft of the motor includes an internal passage with an inlet having a size and taper sufficient to provide the desired rate of cooling oil flow through the motor. A lower bearing proportioning arrangement applies a high percentage of a small proportion of the total oil flow to the lower bearing. An upper bearing proportioning arrangement applies a low percentage of a large proportion of the total oil flow to the upper bearing. Together these features assure a high degree of motor cooling without overlubricating the bearings.

21 Claims, 3 Drawing Figures

CENTRIFUGAL OIL PUMP FLOW PROPORTIONING AND COOLING SYSTEM

BACKGROUND OF THE INVENTION

The present invention relates to centrifuge motor lubricating systems and is directed more particularly to a centrifuge motor lubricating system which circulates lubricating oil rapidly enough to provide a high degree of motor cooling, and yet which does not overlubricate the motor bearings.

Because of the critical importance of adequately lubricating the bearings of high speed centrifuge motors, considerable effort has been devoted to developing lubrication systems therefor. Among the lubrication systems which have been used prior to the present invention, one of the most effective is a system in which the shaft or spindle of the motor is provided with an internal passage having a tapered inlet that extends into an oil sump. As this shaft rotates, oil is drawn into the tapered inlet and flows upwardly along the surface of the passage and then outwardly through radial holes which are located in the vicinity of the upper and lower motor bearings. By properly selecting the size and shape of the internal passage and of the radial holes, such systems are able to provide a continuous supply of lubricating oil to the bearings. One example of a lubricating system of this type is described in U.S. Pat. No. 2,766,081 which issued in the name of E. Wiedemann on Oct. 9, 1956.

While lubricating systems of the above type are adequate in most respects, they have certain undesirable features which limit the usefulness thereof. The most important of these is the difficulty of assuring the desired distribution of oil between the upper and lower bearings. This distribution can, for example, be significantly affected by small differences in the dimensions or surface roughness of different parts of the passage, the accumulation of dirt on the surface of the passage, and other factors. As a result, one of the bearings can become overlubricated while the other is underlubricated. Both of these conditions can significantly reduce the useful life of the bearings.

SUMMARY OF THE INVENTION

In accordance with one important feature of the present invention, it has been discovered that the unpredictability of the distribution of lubricating oil between the upper and lower motor bearings may be substantially reduced by introducing a radial discontinuity or step in the passage at a point that is between the upper and lower bearings. Provided that it is of sufficient size, this step serves to effectively partition the passage into two regions having flow properties which are substantially independent of one another. As a result, perturbations in the flow of lubricating oil to one bearing are caused to be substantially independent of perturbations in the flow of lubricating oil to the other bearing. This, in turn, tends to eliminate unpredictable and undesirable interactions between the oil flows to the bearings.

Another advantage of the radial step is that, if it is located in close proximity to the lower lubricating hole, it causes the thickness of the oil layer surrounding the lower lubricating hole to be relatively thin. This thinness is beneficial since it allows the lower lubricating hole to be relatively large, without allowing too much oil to be supplied to the lower bearing. As a result, the lower lubricating hole has less of a tendency to become clogged during the operation of the motor. The proximity of the step to the lubricating hole also tends to cause the flow of oil through the hole to be an approximately constant proportion of the total flow of oil through the shaft. Thus, the step and hole together serve a flow proportioning function.

Still another important feature of the present invention is the provision of an improved flow proportioning member in the vicinity of the upper motor bearing. This proportioning member preferably has blocking sections, such as projecting teeth, which cause some of the oil emerging from the lubricating holes to be broken into a lubricating mist fine enough to enter the rapidly rotating bearing, and non-blocking sections, such as inter-teeth gaps, which allow the remaining oil to return to the sump without lubricating the bearing. Because the blocking sections of this member may be made either relatively small or relatively large with respect to the nonblocking sections thereof, the fraction of the total oil flow which is used to lubricate the upper bearing may be fixed at any desired value.

In the preferred embodiment, the proportioning member is constructed so that only a relatively small fraction of the overall oil flow is used to lubricate the upper bearing. This, in turn, makes it possible for the overall rate of oil flow to be many times larger than it could otherwise be without overlubricating the upper bearing. One advantage of this increased oil flow rate is that it causes the thickness of the lubricating oil layer in the passage to increase, thereby reducing the effect of flow transients on the rate of oil flow to the bearings. More importantly, this increased oil flow rate increases the rate at which heat may be conducted away from the armature of the motor. Thus, the proportioning member of the invention not only stabilizes the flow of lubricating oil, but also causes the motor to run cooler.

DESCRIPTION OF THE DRAWINGS

Other objects and advantages of the present invention will be apparent from the following description and drawings in which.

DESCRIPTION OF THE PREFERRED EMBODIMENTS

Figure 1:
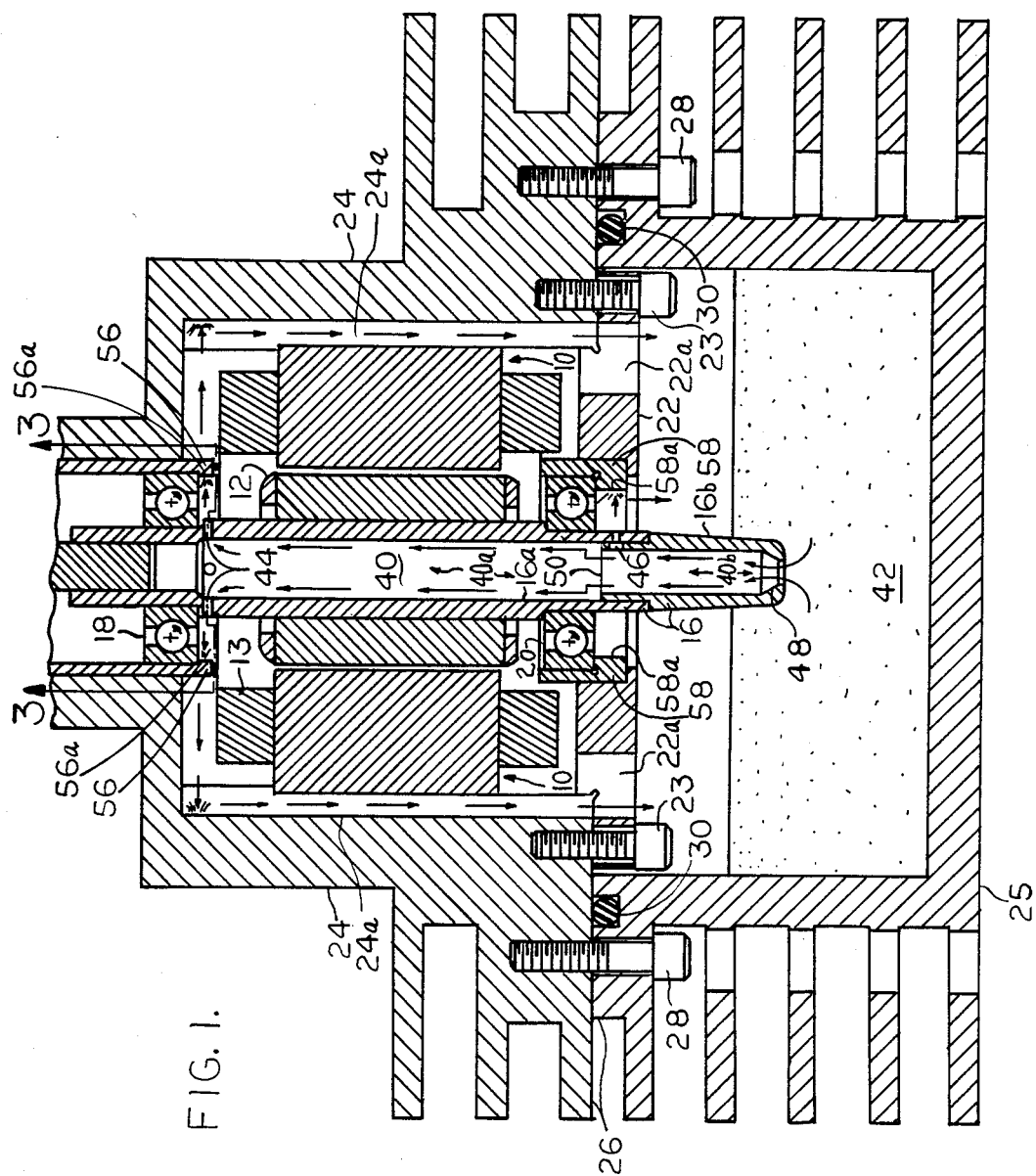
FIG. 1 is a simplified cross-sectional view of a centrifuge motor assembly having a lubricating system that is constructed in accordance with the present invention.

Referring to FIG. 1, there is shown a simplified cross-sectional view of a centrifuge motor drive assembly which includes one embodiment of the lubricating system of the invention. This drive assembly includes an a-c motor 10 having an armature 12 and a stator 14. The shaft or spindle 16 of armature 12 is journalled in upper and lower bearings 18 and 20, respectively, which preferably comprise ball bearings of a size and type suitable for use in high speed centrifuges. Of these, lower bearing 20 is supported by a generally circular plate 22 which is bolted to the lower part of the upper section 24 of a motor housing 26 by suitable bolts 23, and upper bearing 18 is mounted within a neck formed by the upper part of upper housing section 24. Housing 26 is completed by lower housing section 25, which is bolted to upper housing section 24 by bolts 28, an O-ring 30 being clamped therebetween to provide an oil tight seal. Stator 14 is securely mounted within upper housing section 24 by a conventional mounting arrangement, not shown.

To the end that lubricating oil may be supplied to upper and lower bearings 18 and 20 on a substantially continuous basis, shaft 16 includes an internal passage 40 through which oil can flow upwardly from an oil sump 42. Shaft 16 also includes a plurality of upper lubricating holes 44, best seen in FIG. 3, through which this upwardly flowing oil may flow outwardly toward upper bearing 18, and at least one lower lubricating oil 46, best seen in FIG. 2, through which this upwardly flowing oil may flow outwardly toward lower bearing 20. The return path for this flow of oil includes a plurality of oil flow channels, such as 24a, which are cut into in the sides of upper housing section 24, and a plurality of respective holes 22a, which are drilled through plate 22. The pressure necessary to make oil flow in this path is generated centrifugally by the tapered inlet end 48 of shaft 16 as the latter is rotated at high speed in sump 42. It will be understood that the size and taper of inlet 48 are selected to provide the desired total rate of flow of oil through passage 40.

In accordance with one important feature of the present invention, passage 40 is provided with a radial discontinuity or step 50 which is located between upper and lower lubricating holes 44 and 46, preferably in close proximity to the latter. As will be explained more fully presently, step 50 serves to fluidically partition passage 40 into a first region 40a which conducts the flow of oil for upper lubricating holes 44, and a second, lower region 40b which conducts the flow of oil for lower lubricating hole 46. This partitioning is beneficial because it reduces the extent to which variations in the dimensions and surface roughness of different parts of passage 40 can affect the distribution of oil flow between the upper and lower lubricating holes. As a result, this step reduces the need for maintaining tight tolerances in the dimensions and surface finish of passage 40, and consequently reduces the cost of manufacturing shaft 16.

Another beneficial effect of step 50 is that it causes the thickness of the layer of oil surrounding lower lubricating hole 46 to be less than would be the case if passage 40 had a constant radius. This, in turn, allows lower lubricating hole 46 to be made larger, for a given rate of flow therethrough, than would otherwise be possible. As a result of this larger hole size, the lower portion of the lubricating system of FIG. 1 has an improved ability to resist clogging.

If step 50 is located in close proximity to hole 46, it has the further beneficial effect of causing the oil flow through hole 46 to be a relatively small and approximately constant proportion of the total oil flow through shaft 40. As a result, the total oil flow through shaft 40 may be made larger than would otherwise be possible without overlubricating lower bearing 20. This greater total oil flow, in turn, increases the extent to which motor 10 is cooled by the flow of lubricating oil. Thus, step 50 and hole 46 cooperate to serve an oil flow proportioning function which enhances the cooling effect produced by the lubricating system of the invention.

Figure 2:
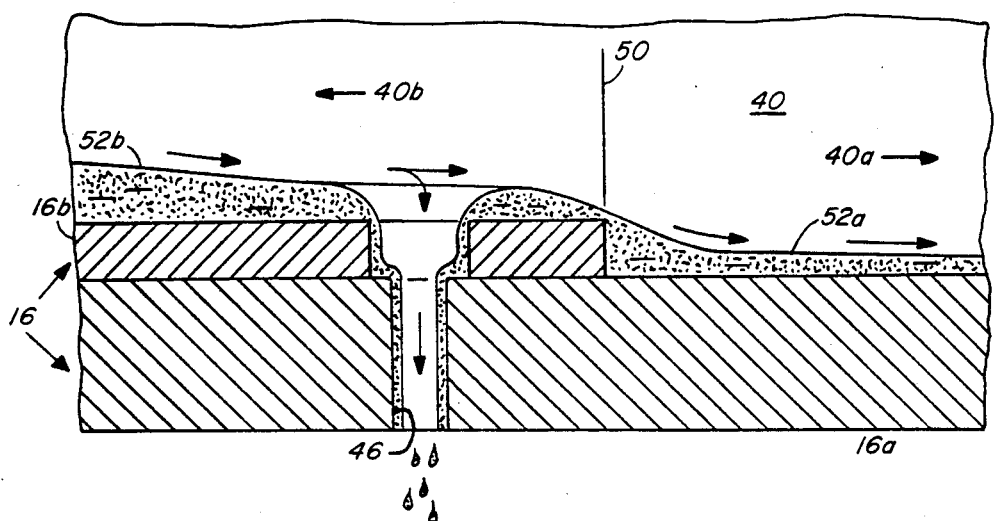
FIG. 2 is an enlarged partial cross-sectional view which illustrates the nature of the lubricating oil flow in the vicinity of the lower lubricating hole.

The reasons why the above-described results occur are most easily understood with reference to FIG. 2. In FIG. 2, there is shown an enlarged partial cross-sectional view of the part of shaft 16 which is located in the vicinity of lower lubricating hole 46 and step 50, together with the oil layer that flows thereover. Referring first to the portion of the oil flow 52a which is downstream of (i.e., above) radial step 50, it is apparent that this flow has a maximum depth which is slightly less than that of step 50, and that the depth of this flow decreases monotonically in the direction of upper lubricating holes 44. Significantly, the maximum depth of oil flow 52a will remain slightly less than the height of step 50, substantially without regard to the depth profile of the oil flow upstream of (i.e. below) step 50, so long as shaft 16 is rotating rapidly enough to maintain continuous a flow of oil over step 50. It will therefore be seen that step 50 causes the oil depth profile in passage region 40a to be substantially independent of the oil depth profile in passage region 40b, or, equivalently, that step 50 partitions passage 40 into two fluidically isolated regions. As a result, factors such as departures in the dimensions or surface finishes of regions 40a and 40b from their ideal values to not significantly affect the distribution of the overall oil flow between upper holes 44 and lower hole 46. Thus, step 50 allows shaft 16 to be machined to less critical tolerances.

Referring next to the portion of the oil flow 52b which is upstream of step 50, it will be seen that it has a depth which is at a minimum at step 50 and increases monotonically in the direction of inlet 48. In addition, because of the flow of oil into hole 46, the depth of the oil at the edge of hole 46 also tends to be at a minimum. These minimum depth points, together with the close proximity of hole 46 to step 50, tend to force the part of flow 52b which surrounds hole 46 to have a particular shape and to remain relatively thin. Because of this thinness, the rate of oil flow through lubricating hole 46 tends to be a relatively small fraction of the overall rate of oil flow through passage 40. As a result, for a given desired rate of oil flow through hole 46, hole 46 may be made larger than would be the case if step 50 were not present. This, in turn, assures that hole 46 has less of a tendency of clog than the holes of prior lubricating systems which provide similar lower bearing oil flow rates.

Significantly, as the acceleration of shaft 16 increases the rate of flow of oil through passage 40, the depths of flows 52a and 52b remain approximately constant, particularly at the above mentioned minimum depth points. This allows the rate of oil flow into hole 46 to increase in absolute terms, but not in relation to the overall oil flow rate through passage 40. It will therefore be seen that the sizes of step 50 and hole 46, and the spacing therebetween, fix the proportion of the total oil flow which is diverted to lower bearing 20. Thus, bearing 20 is at all times assured of an adequate supply of lubricating oil.

In the preferred embodiment, shaft 16 preferably includes first and second sections 16a and 16b which are manufactured separately, and which are attached to one another during final assembly of the drive assembly. One advantage of this two-part construction is that it simplifies the machining and inspection of both of the two parts of shaft 16. Another advantage is that it allows the upper end of lower shaft section 16b to serve as radial step 50.

In accordance with another feature of the present invention, the lubricating system of FIG. 1 includes an upper nebulizing member 56 having an impact surface 56a that is positioned to be struck by droplets of oil emerging from upper lubricating holes 44, and a lower nebulizing member 58 having an impact surface 58a that is positioned to be struck by droplets of oil emerging from lower lubricating hole 46. Members 56 and 58 preferably also serve as bearing retaining elements which are secured in a conventional manner to upper housing section 24 and plate 22, respectively.

In operation, members 56 and 58 serve to convert the oil droplets which strike surfaces 56a and 58a thereof into an oil spray or mist (indicated in FIG. 1 by sets of diverging lines) that is fine enough and that has sufficient kinetic energy to enter bearings 18 and 20. This conversion or nebulization has been found to be beneficial because it is known that large droplets of oil can be prevented from entering a rapidly rotating bearing and may result in ball skidding. The tendency of members 56 and 58 to nebulize oil droplets is most effective when the impact surfaces thereof are substantially parallel to the axis of rotation of shaft 16. This is because the latter orientation helps to assure that oil droplets are shattered, rather than simply deflected toward the bearing.

As will be explained more fully presently, member 56 serves not only as a nebulizing element, but also as an oil flow proportioning element which limits the amount of oil that is applied to bearing 18 to a predetermined fraction of the total oil flow in passage 40. In the preferred embodiment this fraction is made relatively low so that the total flow of oil can be made great enough to appreciably cool armature 12 without overlubricating bearing 18. The latter flow, which may be termed the cooling component of the total oil flow, circulates in the fluidic path indicated by the arrows in FIG. 1, a path which includes sump 42, passage 40, lubricating holes 44 and one of the plurality of oil return channels, such as 24a, that are provided in housing 24. Because channels 24a are in direct thermal contact with heat radiating fins 24b of housing section 24, the flow of oil therethrough is able to efficiently transport substantial quantities of heat from armature 12 to the ambient air.

Figure 3:
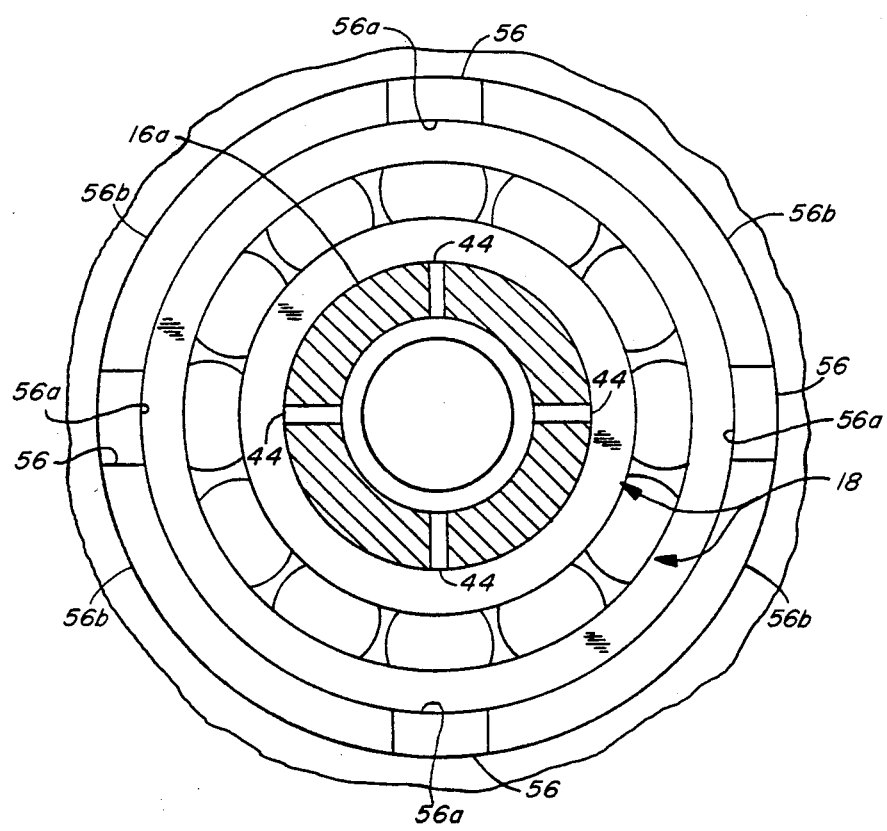
FIG. 3 is an enlarged sectional view taken along the line 3—3 of FIG. 1.

The operation of member 56 as a flow proportioning element will now be described with reference to FIG. 3. As shown in FIG. 3, the lower end of member 56 comprises a serrated ring which surrounds the outer race of bearing 18. The serrations of this ring are formed by four generally rectangular shaped projections or teeth 56a, each of which (as shown in FIG. 1) is long enough to be struck by some of the oil droplets emerging from holes 44 of shaft 16. Separating these teeth are gaps or openings 56b through which oil droplets may pass without striking member 56. As a result, when droplets of oil emerge from holes 44, a certain fraction of them will strike teeth 56a to produce a lubricating spray for bearing 18. The remaining droplets will pass between the teeth and continue outwardly until they strike housing 24 where they coalesce into streams that run down one of the channels 24b to sump 42. Since droplets emerge from holes 44 in all directions, the fraction of oil droplets which lubricate bearing 18 will be proportional to the fraction of the circumference of member 56 which is occupied by teeth 56a, i.e., the fraction of the total circumference which blocks the flow of oil droplets. Thus, the serrated structure of or serrations in member 56 allows the relative proportions of the total oil flow which serve the lubricating and cooling functions to be set at any desired value.

Since most of the heat that is generated in armature 12 is generated above lower lubricating hole 46, the oil which flows through hole 46 has little tendency to cool motor 10. As a result, any oil that flows through hole 46 which is in excess of that necessary to lubricate bearing 20 serves only to divert the flow of cooling oil from where it is needed. Accordingly, in the preferred embodiment of the invention, it is desirable that the rate of oil flow through hole 46 be kept relatively small, and that substantially all of this flow be converted to a lubricating spray. It is therefore not necessary to provide lower nebulizing member 58 with flow proportioning serrations such as those which are present in upper nebulizing member 56: all of the oil that is necessary to lubricate lower bearing 20 can be provided solely by selecting the proper diameter for hole 46, the proper size for step 50 and the proper spacing between hole 46 and step 50. Ther is no reason, in principle, however, why a serrated nebulizing member such as 56 could not be substituted for non-serrated nebulizing member 58, if desired.

In view of the foregoing, it will be seen that a centrifuge lubricating system constructed in accordance with the present invention provides a desirable combination of cooling and lubricating properties. Firstly, the lubricating system of the invention provides a rate of cooling oil flow which can be made as large as necessary to assure the desired cooling of the drive motor. Secondly, the lubricating system of the invention prevents the overlubrication of the lower bearing by providing a lower bearing proportioning arrangement which directs a high percentage of a relatively small proportion of the total oil flow to the lower bearing. Thirdly, the lubricating system of the invention prevents the overlubrication of the upper bearing by providing an upper bearing proportioning arrangement which directs a low percentage of a relatively large proportion of the total oil flow to the upper bearing. Finally, by providing a radial step in the oil flow passage, the lubricating system of the invention stabilizes these proportions at the desired values by effectively isolating the flow properties of the oil flows in the vicinity of the upper and lower lubricating holes.

What is claimed is:

1. In a lubricating and cooling system for a centrifuge motor of the type having a vertical shaft journalled in upper and lower bearings and an oil sump, said shaft defining an internal passage for the flow of oil from the sump and upper and lower holes through which oil on the surface of the passage may flow into the vicinity of the bearings, the improvement comprising:
  (a) a tapered inlet at the lower end of the shaft for forcing oil from the sump upwardly into the passage, the size and taper of said inlet being selected to produce through the passage a flow of oil that is substantially greater than that necessary to lubricate the bearings,
  (b) a lower nebulizing member for breaking a relatively high percentage of the oil emerging from the lower hole into a lubricating spray fine enough to enter the lower bearing,
  (c) an upper nebulizing member for breaking a relatively low percentage of the oil emerging from the upper hole into a lubricating spray fine enough to enter the upper bearing, and for permitting the remaining oil to return to the sump,
  (d) said passage including a radial step between the upper and lower holes, near the lower hole, for limiting the rate of oil flow through the lower hole to a small fraction of the total oil flow through the passage.

2. The system of claim 1 including a bearing retaining member one part of which serves as said upper nebulizing member.

3. The system of claim 1 in which the upper nebulizing member includes at least one projecting tooth, and in which a lubricating spray is produced substantially only when oil strikes said tooth.

4. The system of claim 1 in which the upper nebulizing member includes at least one blocking section adapted to nebulize oil emerging from the upper hole, and at least one non-blocking section adapted to permit oil emerging from the upper hole to return to the sump.

5. The system of claim 1 in which the step is high enough to fluidically isolate the oil flows upstream and downstream thereof.

6. The system of claim 1 in which the sizes of the lower hole and the step are selected to divert from the total oil flow enough oil to lubricate the lower bearing, but not enough oil to overlubricate the same.

7. The system of claim 1 in which the upper nebulizing member is constructed so as to divert from the total oil flow enough oil to lubricate the upper bearing, but not enough oil to overlubricate the same.

8. The system of claim 6 in which the upper nebulizing member is constructed so as to divert from the total oil flow enough oil to lubricate the upper bearing, but not enough to overlubricate the same.

9. The system of claim 8 in which the fraction of the total oil flow that is not applied to the bearings is sufficient to maintain the motor at a safe temperature.

10. The system of claim 1 in which the shaft includes upper and lower sections and in which the step comprises the upper end of the lower section.

11. In a lubricating and cooling system for a centrifuge motor of the type having a vertical shaft journalled in upper and lower bearings and an oil sump, said shaft defining an internal passage for the flow of oil from the sump and upper and lower holes through which oil on the surface of the passage may flow into the vicinity of the bearings, the improvement comprising:
 (a) a tapered inlet at the lower end of the shaft for forcing oil from the sump upwardly into the passage, the size and taper of said inlet being selected to produce through the passage a flow of oil that is substantially greater than that necessary to lubricate the bearings,
 (b) lower proportioning means including a radial discontinuity in the passage for directing a first predetermined fraction of said flow of oil through the lower hole, and
 (c) upper proportioning means for diverting a predetermined fraction of the oil emerging from the upper hole into the vicinity of the upper bearing.

12. The system of claim 11 in which the radial discontinuity is a step located between the upper and lower holes.

13. The system of claim 12 in which the step is high enough to fluidically isolate the oil flows upstream and downstream thereof.

14. The system of claim 11 in which the upper proportioning means includes at least one blocking section adapted to nebulize oil from the upper hole, and at least one non-blocking section adapted to permit oil from the upper hole to return to the sump.

15. The system of claim 11 in which the upper proportioning means comprises a ring having at least one projecting tooth.

16. The system of claim 11 including a nebulizing member for nebulizing oil emerging from the lower hole.

17. The system of claim 11 in which the shaft includes upper and lower sections and in which the radial discontinuity comprises the upper end of the lower section.

18. In a lubricating and cooling system for a centrifuge motor of the type having a vertical shaft journalled in upper and lower bearings and an oil sump, said shaft defining an internal passage for the flow of oil from the sump and upper and lower holes through which oil on the surface of the passage may flow into the vicinity of the bearings, the improvement comprising:
 (a) a tapered inlet at the lower end of the shaft for forcing oil from the sump upwardly into the passage,
 (b) a radial step for partitioning the surface of the passage into a lower surface region having a relatively small radius and an upper surface region having a relatively large radius, said step being located between the upper and lower holes,
 (c) a lower nebulizing member for receiving oil from the lower hole and for converting the same into a lubricating spray fine enough to enter the lower bearing,
 (d) an upper nebulizing member for receiving oil from the upper hole and for converting the same into a lubricating spray fine enough to enter the upper bearing, said upper nebulizing member including at least one gap through which oil may return to the sump without being converted into said spray,
 (e) whereby the upper and lower bearings are provided with predetermined respective proportions of the oil entering said inlet, and the shaft is provided with a flow of oil sufficient to prevent the same from overheating.

19. The system of claim 18 in which the step is located in close proximity to the lower hole whereby the oil flowing through the lower hole comprises a relatively small fraction of the oil entering said inlet.

20. The system of claim 18 in which the shaft includes upper and lower sections and in which the step comprises the upper end of the lower section.

21. The system of claim 18 in which the upper nebulizing member includes a plurality of serrations which assure that only a relatively small fraction of the oil flowing through the upper hole is converted into a lubricating spray.

* * * * *